(12) United States Patent  (10) Patent No.: US 8,792,878 B2
Watanabe  (45) Date of Patent: Jul. 29, 2014

(54) COMMUNICATION DEVICE, CONTROL DEVICE, AND METHOD FOR ADJUSTING TRANSMISSION PARAMETER

(71) Applicant: Fujitsu Limited, Kawasaki (JP)

(72) Inventor: Kimio Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/690,987

(22) Filed: Nov. 30, 2012

(65) Prior Publication Data

US 2013/0109373 A1    May 2, 2013

Related U.S. Application Data

(63) Continuation of application No. PCT/JP2010/004051, filed on Jun. 17, 2010.

(51) Int. Cl.
*H04W 4/00* (2009.01)

(52) U.S. Cl.
USPC ........................................ 455/422.1; 370/235

(58) Field of Classification Search
USPC ................. 455/422.1; 370/230, 231, 235, 329
See application file for complete search history.

(56) References Cited

U.S. PATENT DOCUMENTS

| 6,473,623 | B1 | 10/2002 | Benveniste |
| 2010/0226251 | A1* | 9/2010 | Imai et al. ..................... 370/235 |

FOREIGN PATENT DOCUMENTS

| JP | 10-136442 A | 5/1998 |
| JP | 10-145842 A | 5/1998 |
| JP | 11-234739 A | 8/1999 |
| JP | 2003-111133 A | 4/2003 |

* cited by examiner

*Primary Examiner* — Sam Bhattacharya
(74) *Attorney, Agent, or Firm* — Arent Fox LLP

(57) ABSTRACT

A communication device forms a first cell and performs radio communication with a mobile station. The communication device includes a first information acquiring unit that acquires a first traffic volume corresponding to a traffic volume that occurs in the first cell at a first time, a second information acquiring unit that acquires a second traffic volume corresponding to a traffic volume that occurs at the first time in each of second cells of second communication devices adjacent to the communication device, a calculating unit that calculates a predicted value, in a future relative to the first time, of a traffic volume occurring in the first cell on the basis of the first traffic volume and the second traffic volume, and an adjusting unit that adjusts a transmission parameter of the communication device on the basis of the predicted value.

16 Claims, 11 Drawing Sheets

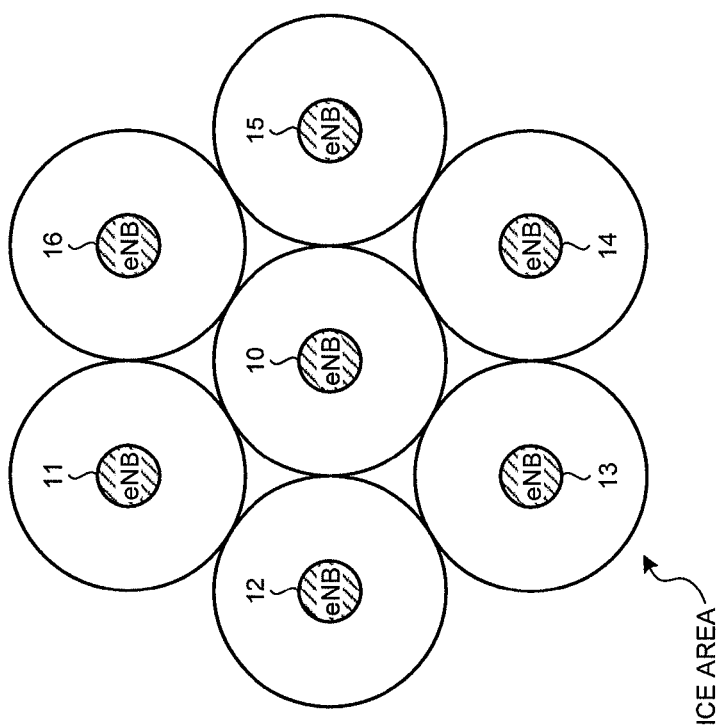
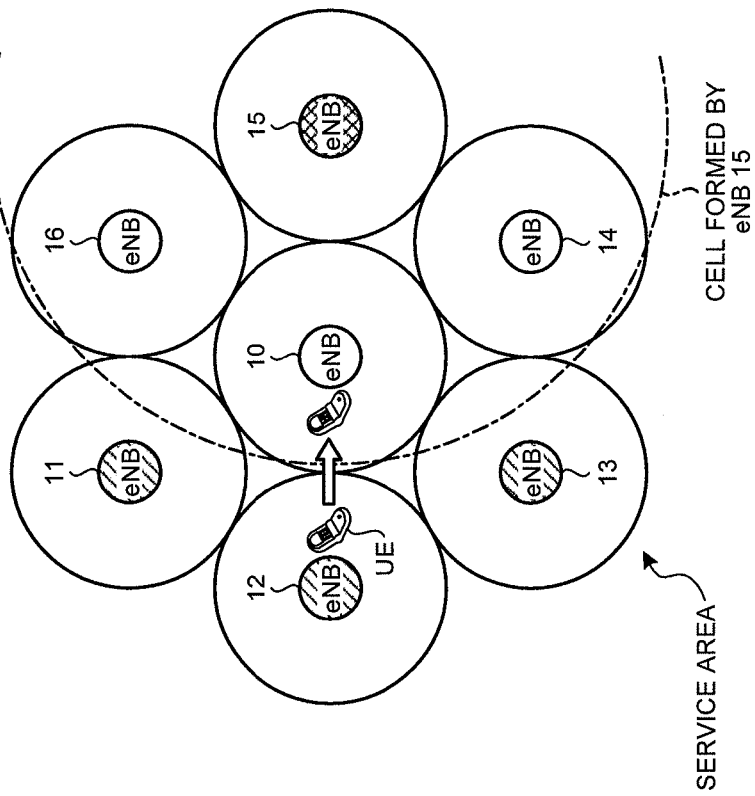

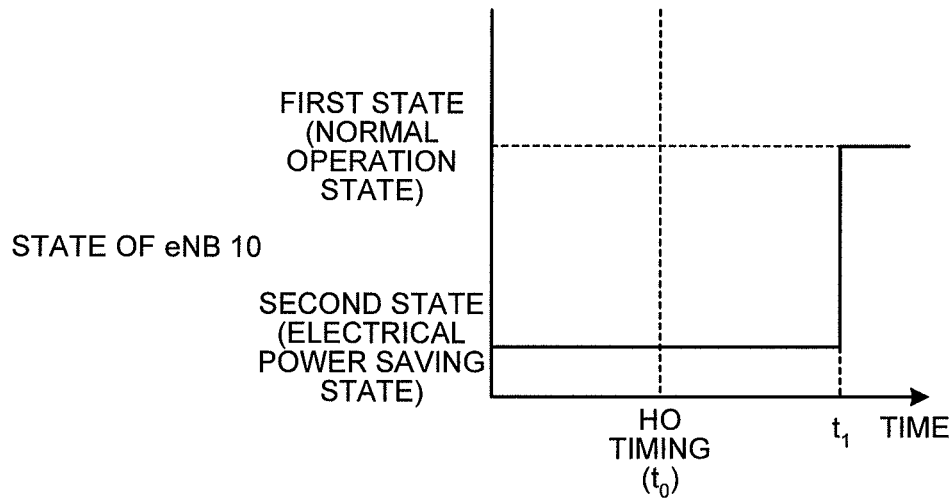
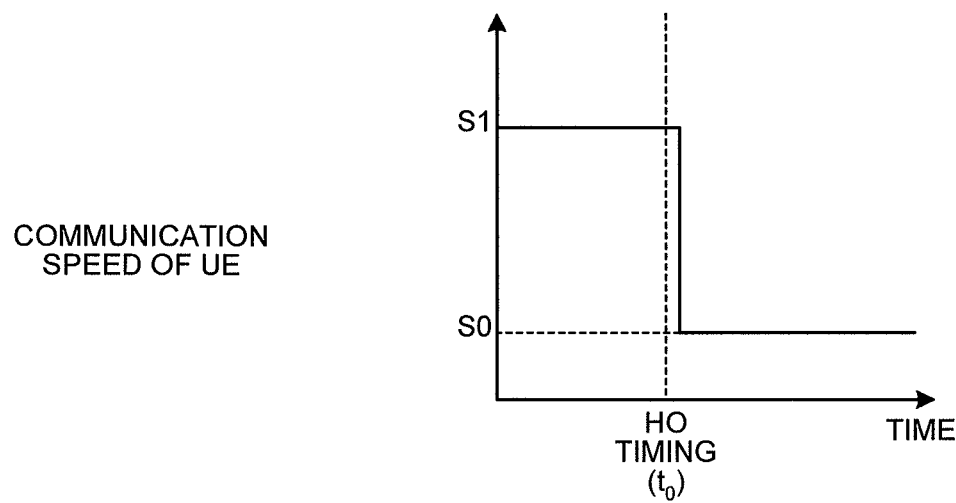

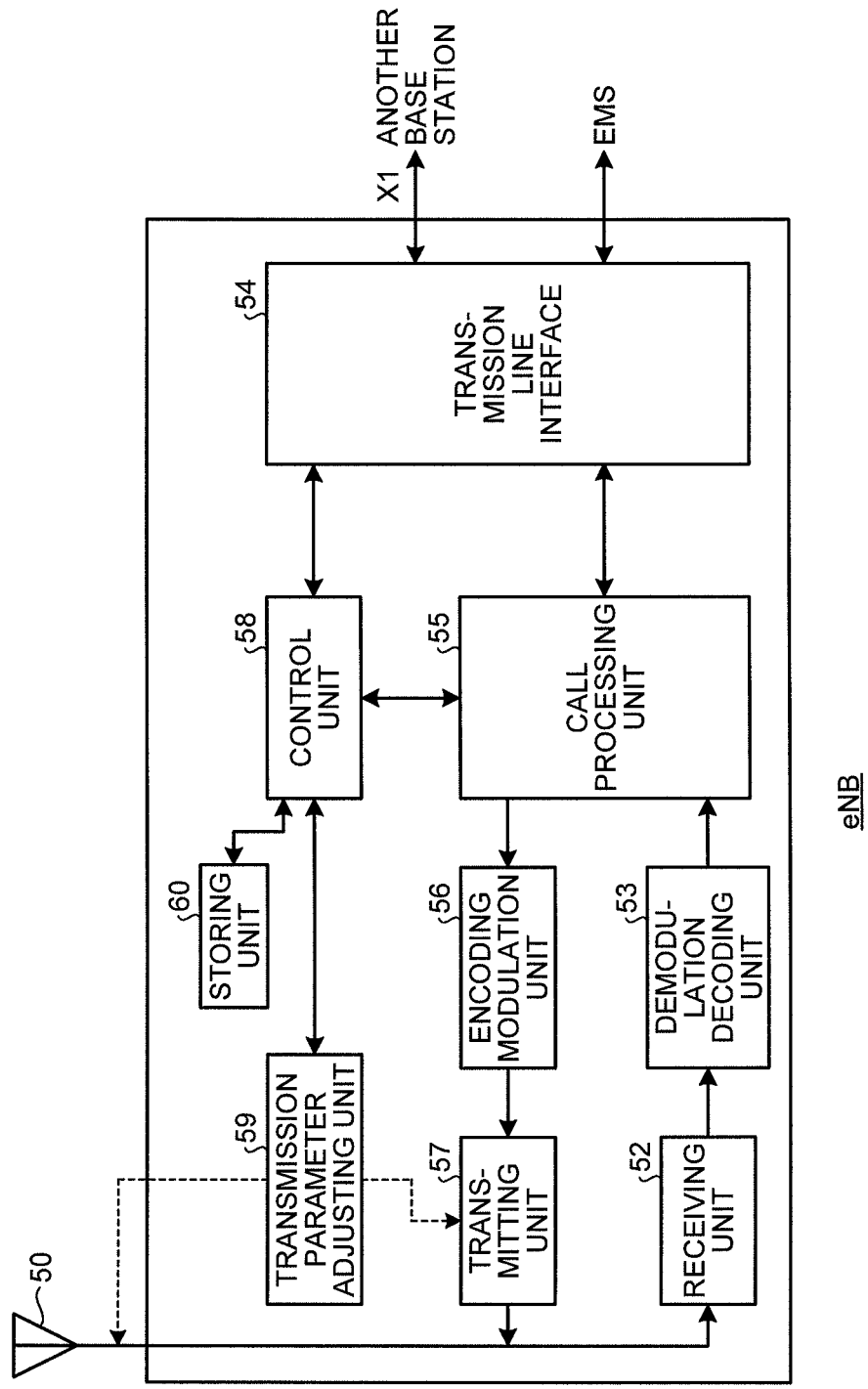

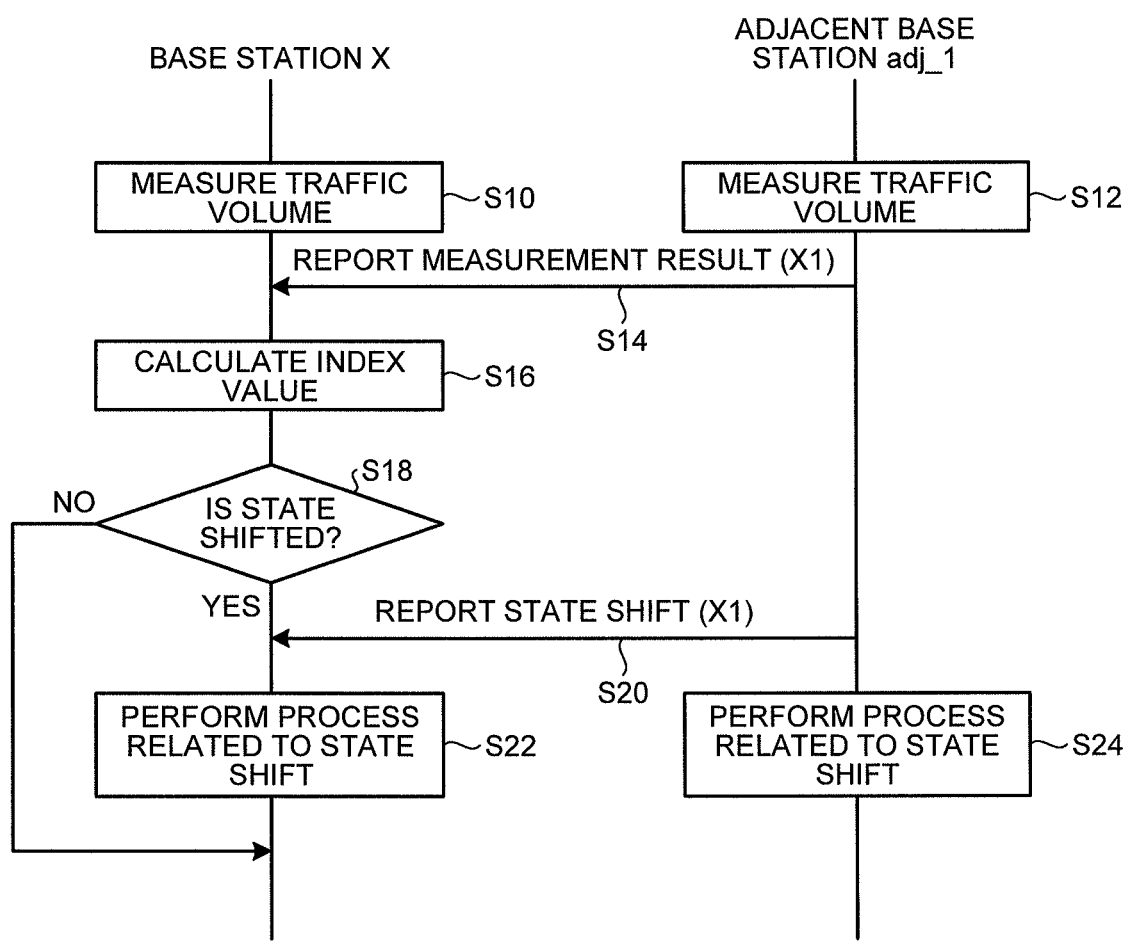

EMS

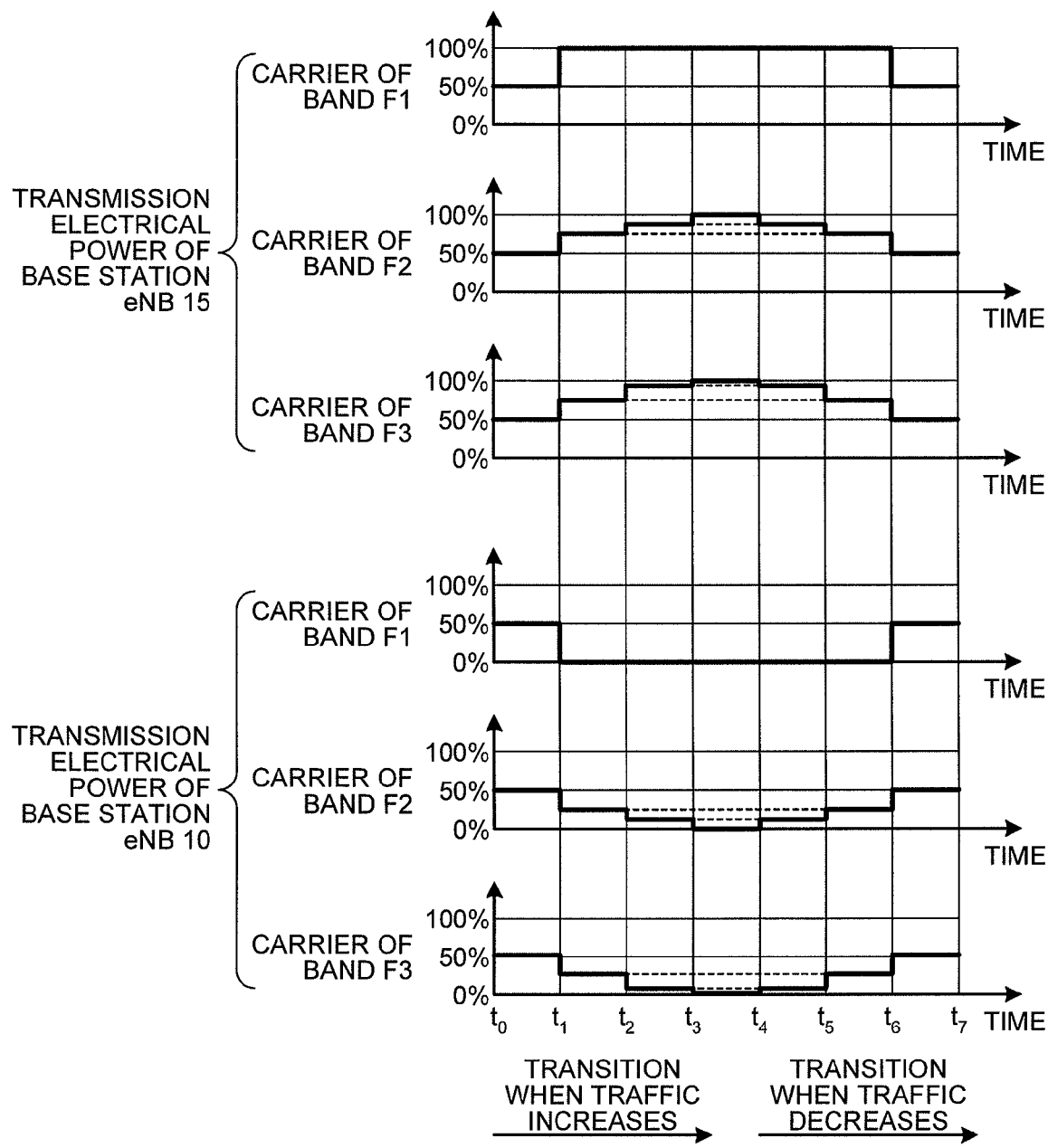

COMMUNICATION DEVICE, CONTROL DEVICE, AND METHOD FOR ADJUSTING TRANSMISSION PARAMETER

CROSS-REFERENCE TO RELATED APPLICATION

This application is a continuation of International Application No. PCT/JP2010/004051, filed on Jun. 17, 2010, the entire contents of which are incorporated herein by reference.

FIELD

The embodiments discussed herein are directed to a technology for adjusting, in a mobile communication system that includes a plurality of radio base stations, an operation state or a transmission parameter of a radio base station in order to reduce electrical power consumption in the mobile communication system.

BACKGROUND

In a conventional mobile communication system, telecommunications carriers providing the service previously determine the target cell coverage of each radio base station, and transmission parameters are set for each of the radio base stations such that cell coverage can be obtained. The transmission parameters are, for example, radio transmission electrical power with respect to each cell of a radio base station, the height of antennas, antenna patterns (or beamforming), and tilt angles. When the system is in operation, there is a significant variation in traffic volume depending on, for example, the time zone. Consequently, it is inefficient if all the radio base stations in a predetermined area are always in operation or if a transmission parameter is always set to a value that ensures wide cell coverage with respect to all of the radio base stations.

Related to the above points, there is a known mobile communication system that is designed with the aim of reducing electrical power consumption by changing the zone configuration of a radio base station in accordance with the communication traffic state of the system and of preventing a communication area being unavailable due to a change in the zone configuration (see Japanese Laid-open Patent Publication No. 10-145842). In this mobile communication system, a radio control station includes a unit for monitoring, in a centralized manner, communication traffic reported from a radio base station group; a unit for monitoring, in a centralized manner, the electric field intensity of a main radio base station that is reported from each sub radio base station in the radio base station group; a unit for transmitting a radio output variable control signal to a radio base station in the radio base station group; and a database that manages the arrangement configuration of the main radio base station and a plurality of sub radio base stations.

In the conventional mobile communication system described above, if the communication traffic in a predetermined service area that includes a plurality of radio base stations is below a threshold, the zone configuration is changed, i.e., a control is performed such that the radio transmission function in a specific radio base station is stopped and radio transmissions output from another radio base station are increased. However, with such a control, when a handover of a mobile station is performed between cells formed by the radio base stations, there is a problem in that the mobile station sometimes does not maintain the communication in the state it was in before the handover. This problem will be described below with reference to FIGS. 1A, 1B and 2.

FIG. 1A illustrates a mobile communication system in which a plurality of radio base stations eNBs 10 to 16 are arranged in a predetermined service area. Each of the radio base stations is a communication device that forms a cell. In FIG. 1A, all of the radio base stations in the service area are in a normal operation state. In contrast, in FIG. 1B, the radio base stations eNBs 11 to 13 remain in the normal operation state; however, the radio base stations eNBs 10, 14, and 16 are in an electrical power saving state. Furthermore, in FIG. 1B, the radio base station eNB 15 is in a state in which transmission electrical power is higher than that in the normal operation state; therefore, the cell formed by the radio base station eNB 15 covers the cells that have been formed by the radio base stations eNBs 10, 14, and 16 when they were in the normal operation state. Referring to FIG. 1B, a description will be given of a case in which a handover is performed on a mobile station UE from a cell formed by the radio base station eNB 12 to a cell formed by the radio base station eNB 15.

In the cell configuration illustrated in FIG. 1B, the cell area to be covered by the radio base station eNB 15 is enlarged; however, because neither the signal processing capacity performed by the radio base stations nor the number of mobile stations that can be accommodated by the radio base stations is changed before and after a change in state, hence, there may be a case in which a mobile station UE that has just been handed over is not accommodated by a radio base station. In such a case, if a handover is performed within a predetermined service area, the total volume of the communication traffic in the service area does not change; therefore, the conventional mobile communication system described above does not perform a control in which the cell configuration (i.e., the zone configuration) is changed. Specifically, a control for changing the cell configuration from the state illustrated in FIG. 1B to that in FIG. 1A is not performed; therefore, the signal processing capacity in accordance with the handover of the mobile station UE is not improved.

Furthermore, even if a control for changing the cell configuration from the state illustrated in FIG. 1B to that in FIG. 1A is performed on the basis of the detection of the handover of the mobile station UE, it takes a certain amount of time to change the cell configuration; therefore, the mobile station UE does not maintain the communication state that it had before the handover immediately after the handover. Specifically, communication may possibly be stopped after the handover of the mobile station UE or the transmission speed may possibly be reduced. This problem will be described with reference to FIGS. 2A and 2B.

FIGS. 2A and 2B illustrate, along the time axis, the above-described problem related to the handover of the mobile station UE. In FIG. 2A, the state of the radio base station eNB 10 is illustrated along the time axis. In FIG. 2B, the transmission speed of the mobile station UE is illustrated along the time axis. In FIGS. 2A and 2B, if a time period (time $t_0$) has elapsed since a handover (HO) and if a mobile station UE is handed over to the radio base station eNB 15, the radio base station eNB 15 does not accommodate the mobile station UE in terms of the signal processing capacity performed by the radio base station eNB 15; therefore, it is determined that the cell configuration is changed from the state illustrated in FIG. 1B to that in FIG. 1A. However, because it takes a certain amount of time to reach time $t_1$ at which the cell configuration is changed, the transmission speed of the mobile station UE is reduced between time $t_0$ and time $t_1$ (S1→S0) or communication is stopped. The possibility of the occurrence of a reduction in the transmission speed of the handed over mobile station UE or the occurrence of the stopping of communication as described above is high in a future mobile communication system, such as Long Term Evolution (LTE), Ultra Mobile Broadband (UMB), and worldwide interoperability for microwave access (WiMAX), because calls with high bit rates are processed.

SUMMARY

According to an aspect of an embodiment, a communication device performs radio communication with a mobile station by forming a first cell and is connected with other communication devices via a communication link. The communication device includes a first information acquiring unit that acquires a first traffic volume corresponding to a traffic volume that occurs in the first cell at a first time, a second information acquiring unit that acquires a second traffic volume corresponding to a traffic volume that occurs at the first time in each of second cells of second communication devices adjacent to the communication device by using communication with the second communication devices, a calculating unit that calculates a predicted value, in a future relative to the first time, of a traffic volume occurring in the first cell on the basis of the first traffic volume and the second traffic volume, and an adjusting unit that adjusts a transmission parameter of the communication device on the basis of the predicted value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are schematic diagrams illustrating a problem of a conventional mobile communication system;

FIGS. 2A and 2B are schematic diagrams illustrating a problem of the conventional mobile communication system;

FIG. 5 is a block diagram illustrating the configuration of main parts of the base station according to the first embodiment;

FIG. 6 is a flowchart illustrating the flow of a process performed by the base station and an adjacent base station adjacent to the base station according to the first embodiment;

FIG. 11 is a schematic diagram illustrating a preferable method for changing a transmission parameter performed before and after a change in a cell configuration.

DESCRIPTION OF EMBODIMENTS

Figure 3:
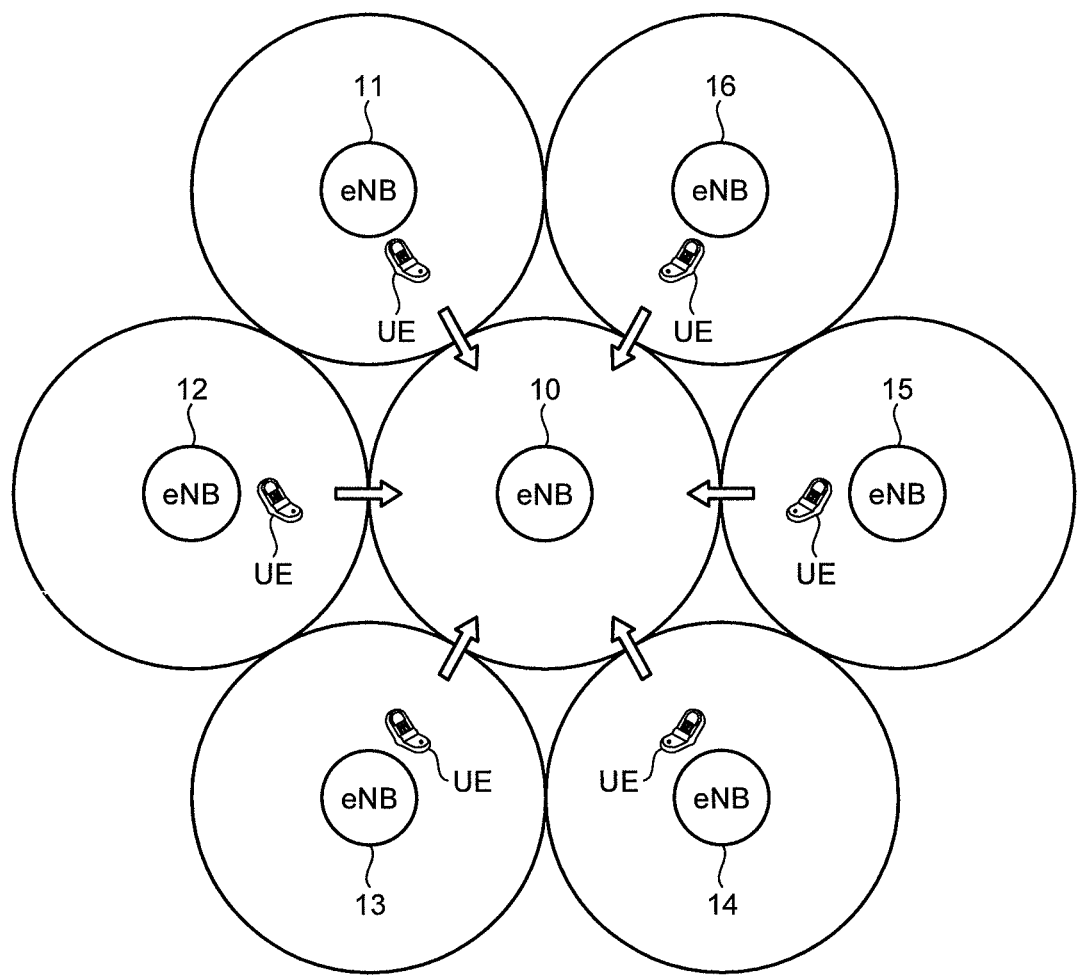
FIG. 3 is a schematic diagram illustrating an example configuration of a mobile communication system according to a first embodiment.

Preferred embodiments of the present invention will be explained with reference to accompanying drawings.

In the embodiments described below, a radio base station and a mobile station are appropriately be referred to as an eNB and a UE, respectively.

[a] First Embodiment

In the following, a first embodiment will be described.

Mobile Communication System

A mobile communication system according to the first embodiment is designed such that a plurality of cell configurations can be used in a service area that contains a plurality of radio base stations (hereinafter, simply referred to as "base stations"). For example, as illustrated in FIG. 1A, the mobile communication system according to the first embodiment uses a normal cell configuration (a first cell configuration) in which cells are formed by using the transmission parameters of radio base stations that are in a normal operation state (referred to as a "first state"). Furthermore, as illustrated in FIG. 1B, in the mobile communication system according to the first embodiment, a specific base station among the base stations shifts to an electrical power saving state (hereinafter, referred to as a "second state") and an electrical power saving cell configuration (a second cell configuration) is used in which the other base stations other than the specific base station shift to a state in which their transmission parameters are adjusted (hereinafter, referred to as a "third state") in order to cover a reduction in the cell area of the specific base station.

When a base station is in the second state, the operation thereof is stopped or a transmission parameter is adjusted such that the area of the cell is smaller than that obtained when the operation is in the normal operation state. Furthermore, when the second cell configuration (electrical power saving cell configuration) is used, in a base station that is in the third state, the transmission parameter is adjusted such that the area of the cell is bigger than that obtained in the normal operation state.

An example is illustrated in FIG. 1B, where a transmission parameter is controlled such that the area of the cell of the base station eNB 15, which is in the third state, is bigger than that in the first state. The transmission parameter to be controlled mentioned here is, for example, radio transmission electrical power, the height of the antennas, antenna patterns (or beamforming), and tilt angles. Each base station in a service area is connected by a predetermined interface (for example, an X2 interface in LTE) and any change in the cell configuration is performed cooperatively among the base stations. For example, in the example illustrated in FIG. 1B, by using communication between the base station eNB 10 and the base station eNB 15, the base station eNB 15 is notified that the base station eNB 10 shifts from the normal operation state to the electrical power saving state and, in response to this notification, the transmission parameter of the base station eNB 15 is adjusted. It is previously determined which base station covers the base station that enters the electrical power saving state in a service area.

In each of the base stations, in accordance with a change in the cell configuration, an adjacent cell list that is information containing a list of base stations (or IDs of cells) adjacent to the subject base station is updated.

In the following description, the state of a base station means one of the first, the second, and the third states described above.

Index Value for Selecting the State of a Base Station

In the following, a description will be given of an index value for selecting the state (one of the first, the second, and the third states) of a base station among other base stations in a service area. The focus here is on a base station X in a service area and a plurality of base stations adj_1, adj_2, . . . , and adj_N, which are adjacent to the base station X. At this point, an index value of the base station X is calculated using Equation (1) below:

$$\text{Index value} = \text{Traffic\_}X + \Sigma(\text{Traffic\_adj\_}n) \quad (1)$$

In Equation (1) above, Traffic_X is the current traffic volume (for example, traffic volume at a first time) occurring in the cell of the base station X, i.e., a traffic volume (a first traffic volume) currently occurring in the base station X; Traffic_adj_n (n=1, 2, . . . , N) is the current traffic volume occurring in the respective cells of the multiple base stations adj_1, adj_2, . . . , and adj_N, which are adjacent to the base station X, i.e., the traffic volume (a second traffic volume) currently occurring in each of the base stations; and Σ of Σ (Traffic_adj_n) is the sum of n=1, 2, . . . , and N.

The traffic volume occurring in a base station (hereinafter, referred to as an "adjacent base station") adjacent to the base station X is reported to the base station X by using a predetermined interface (for example, an X2 interface in LTE) after the traffic volume is measured in each of the base stations. Any method can be used to measure the traffic volume in each of the base stations. A method for measuring, for example, a resource block processed in each of the base stations, the number of packets (the number of PDUs) per unit time, an averaged volume of samples obtained in a predetermined time, or a throughput can be used as the method to measure the traffic volume.

When an index value is calculated, traffic volumes of the adjacent base stations, which are adjacent to the subject base station, are added to the traffic volume of the subject base station. The reason for this operation will be described with reference to FIG. 3. FIG. 3 illustrates a mobile communication system in a service area that includes the base station eNB 10 (corresponding to the base station X), which is to be targeted for calculating an index value and a plurality of adjacent base stations eNBs 11 to 16, which are adjacent to the base station eNB 10. As conceptually illustrated in FIG. 3, mobile stations UEs currently connected to the base stations eNBs 11 to 16, respectively, may possibly be handed over to the base station eNB 10 in the future. Accordingly, in the first embodiment, when an index value of a base station is calculated, in addition to the traffic volume of the subject base station, traffic volumes of all the adjacent base stations adjacent to the subject base station are taken into consideration. Specifically, an index value calculated in the base station eNB 10 is a predicted value of the future traffic volume of the base station eNB 10 obtained by predicting the maximum increase in the traffic volume due to a mobile station UE that may possibly be handed over from an adjacent base station.

In the example illustrated in FIG. 3, the base station eNB 10 is used as a base station to be targeted for calculating an index value. Index values of the other base stations are calculated in a similar manner. For example, in FIG. 3, when an index value of the base station eNB 16 is calculated, traffic volumes of the adjacent base stations eNBs 10, 11, and 15 adjacent to the base station eNB 16 are taken into consideration.

Each of the base stations in the service area selects its own state (one of the first, the second, and the third states) by comparing its calculated index value with a predetermined threshold. Specifically, if an index value exceeds a predetermined threshold, the first state (normal operation state) is selected, whereas if an index value is smaller than a predetermined threshold, the second state (electrical power saving state) is selected. Because the index value is calculated by predicting the maximum increase in a traffic volume due to a mobile station UE that is possibly handed over from an adjacent base station, the subject base station does not shift its state after the mobile station UE has been handed over. This will be described with reference to FIGS. 4A and 4B.

Figure 4A:
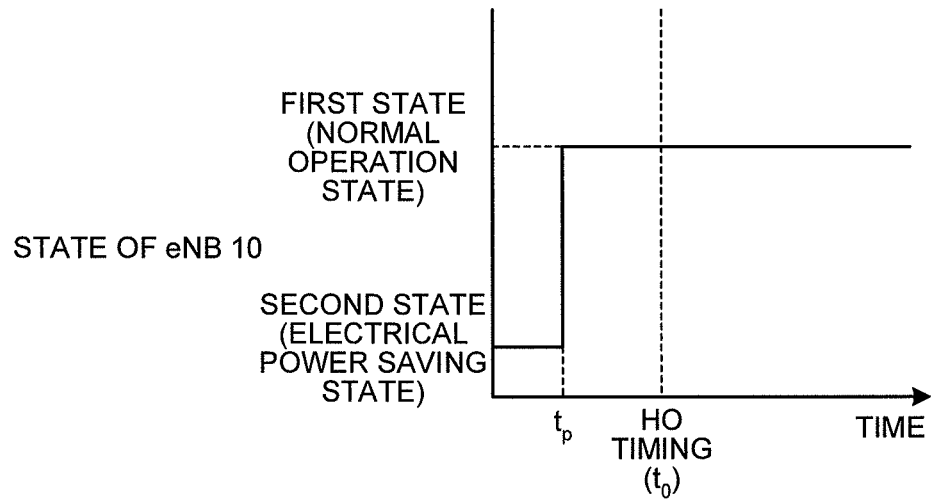
FIGS. 4A and 4B are schematic diagrams illustrating the state of a base station according to the first embodiment and the transmission speed of a mobile station handed over to the base station along the time axis.
Figure 4B:
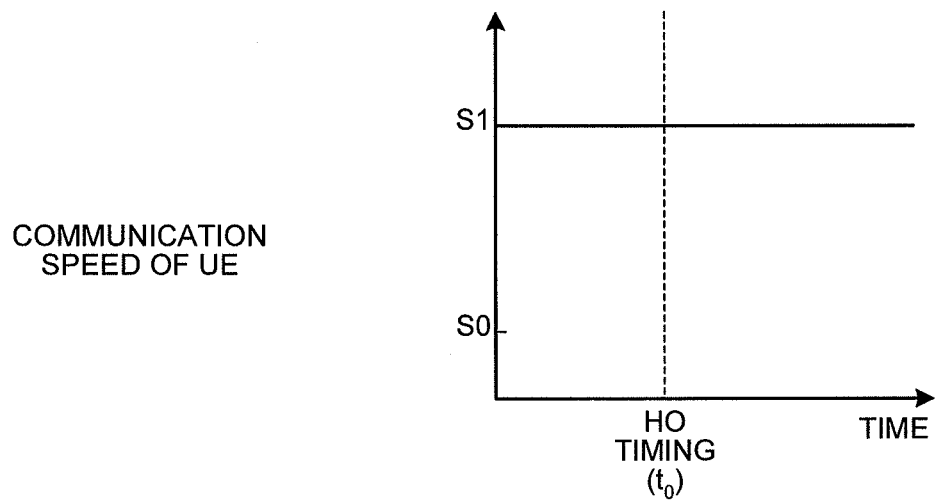

In FIG. 4A, an example is given of a base station to be targeted for calculating an index value. The state of the base station eNB 10 (see FIG. 3) is illustrated along the time axis and, in FIG. 4B, and the transmission speed of the mobile station UE to be handed over to the base station eNB 10 is illustrated along the time axis. In FIGS. 4A and 4B, before reaching the time (time $t_0$) at which a handover (HO) of a mobile station UE to the base station eNB 10 is actually performed, the traffic volume of communication of the mobile station UE is calculated as the traffic volume of an adjacent base station adjacent to the base station eNB 10 and is reported to the base station eNB 10. Accordingly, the index value calculated in the base station eNB 10 is calculated at, for example, time $t_p$ that is before time $t_0$ as a value greater than the traffic volume that is occurring in the base station eNB 10. If the base station eNB 10 is in the second state until, for example, time $t_p$, the base station eNB 10 shifts from the second state to the first state at time $t_p$. Accordingly, the base station eNB 10 can accommodate the mobile station UE that is to be handed over without any problem in terms of throughput of the base station eNB 10. Consequently, communication and the transmission speed of the mobile station UE can be maintained before and after the handover of the mobile station UE.

Configuration of the Base Station

In the following, the configuration of the base station will be described with reference to FIG. 5. FIG. 5 is a block diagram illustrating the configuration of the main parts of the base station (eNB) according to the first embodiment.

In FIG. 5, the base station according to the first embodiment includes an antenna 50 for both transmission and reception, a receiving unit 52, a demodulation decoding unit 53, a transmission line interface 54, a call processing unit 55, an encoding modulation unit 56, a transmitting unit 57, a control unit 58, a transmission parameter adjusting unit 59, and a storing unit 60.

The receiving unit 52 includes, for example, a band limiting filter, a low noise amplifier (LNA), a local frequency transmitter, a quadrature demodulator, an automatic gain control (AGC) amplifier, and an analog-to-digital (A/D) converter. The receiving unit 52 converts an RF signal received from a mobile station via the antenna 50 to a digital baseband signal. Furthermore, the receiving unit 52 separates the received signal into reference signals, such as a data signal, a control signal, and a pilot signal.

The demodulation decoding unit 53 performs demodulation and decoding processes on the data signal and the control signal. On the basis of the channel estimated value obtained from the reference signal separated by the receiving unit 52, channel compensation is performed on the data signal and the control signal.

The transmission line interface 54 includes interface circuits between adjacent base stations, a core network apparatus, and, if appropriate, one of an element management system (EMS) and operation system (OPS)(hereinafter, referred to as an "EMS/OPS"), or both.

The call processing unit 55 performs a process, such as an interface process (e.g., a Media Access Control (MAC) process, a Radio Link Control (RLC) process, a Packet Data Convergence Protocol (PDCP) process, and a Radio Resource Control (RRC) process) for a layer higher than the physical layer of the radio transmission signal and the received signal. The call processing unit 55 also performs scheduling with respect to the radio resource for each connected mobile station.

The encoding modulation unit 56 performs encoding and modulation processes on the reference signals, such as a data signal, a control signal, and a pilot signal for each mobile station and multiplexes the data signal, the control signal, and the reference signal. The transmitting unit 57 includes, for example, a digital-to-analog (D/A) converter, a local frequency transmitter, a mixer, a power amplifier, and a filter. After performing up-conversion on the multiplexed transmission signal from the baseband frequency to the radio frequency, the encoding modulation unit 56 emits the signal from the antenna 50 to space.

The control unit 58 is mainly formed by a microcontroller and performs various kinds of control inside the base station and signal processing as needed. The storing unit 60 stores therein data used for the control performed by the control unit 58. The control unit 58 accesses the storing unit 60 for reading and writing data.

The control unit 58 calculates its own traffic volume by cooperating with the call processing unit 55. A traffic volume is calculated by using a method for measuring, for example, a resource block processed by the call processing unit 55, the number of packet (the number of PDUs) per unit time, an averaged volume of samples obtained in a predetermined time, or throughput. The traffic volume calculated by the control unit 58 is reported to the other base stations by a predetermined interface (for example, the X2 interface in LTE) via the transmission line interface 54.

The control unit 58 calculates an index value using Equation (1) above on the basis of its own traffic volume calculated by the control unit 58 and on the basis of traffic volumes of the other adjacent base stations reported via the transmission line interface 54. Furthermore, by comparing the calculated index value with a predetermined threshold, the control unit 58 selects its own state (one of the first, the second, and the third states) and outputs the control signal according to the selected state to the transmission parameter adjusting unit 59.

In the example described above, the control unit 58 functions as a first information acquiring unit and a calculating unit, whereas the transmission line interface 54 functions as a second information acquiring unit.

The transmission parameter adjusting unit 59 adjusts a transmission parameter on the basis of the control signal output from the control unit 58 such that the state becomes the state selected by the control unit 58. If a transmission parameter to be adjusted is the radio transmission electrical power, the gain of a power amplifier in the transmitting unit 57 is adjusted.

If the transmission parameter to be adjusted is the tilt angle of an antenna, a tilt angle adjustment mechanism (not illustrated) adjusts the tilt angle to a desired value. A known tilt angle adjustment mechanism can be used; therefore, details thereof will not be described here. An example of a mechanical for controlling the tilt angle of an antenna by driving a member supporting the antenna using a motor is disclosed in, for example, Japanese Laid-open Patent Publication No. 2005-051409. Furthermore, an example of an electrical mechanism for adjusting the orientation of the tilt angle of an antenna by arranging a plurality of antenna units in a perpendicular direction and by controlling the phase of the power supply to each of the antenna units without actually tilting the antenna is disclosed in, for example Japanese Patent No. 4040042.

If the transmission parameter to be adjusted is an antenna pattern (or beamforming), the antenna 50 is constituted by, for example, a plurality of antenna elements. The transmission parameter adjusting unit 59 sets a complex constant (weighting) that is multiplied by a signal allocated to each of the antenna elements such that the electromagnetic wave output from the antenna 50 can obtain directional characteristics in the desired direction.

Method for Controlling the Transmission Parameter

In the following, an example of a method for controlling a transmission parameter performed between the base station X and the adjacent base station adj_1 adjacent to the base station X will be described with reference to FIG. 6. FIG. 6 is a flowchart illustrating the flow of a process performed by the base station X and an adjacent base station adj_1 adjacent to the base station according to the first embodiment.

In FIG. 6, first, in both the base station X and the adjacent base station adj_1, the control unit 58 measures its own traffic volume (Steps S10 and S12). Then, the adjacent base station adj_1 reports the measured traffic volume to the base station X via the transmission line interface 54 (Step S14). Similarly, the traffic volume measured by the base station X is reported to the adjacent base station adj_1, which is, however, omitted in the flowchart illustrated in FIG. 6. The measurement result of the traffic volume with respect to the base station X is reported from, in addition to the adjacent base station adj_1, all of the base stations adjacent to the base station X.

In the base station X, the control unit 58 calculates an index value given by Equation (1) above on the basis of its own traffic volume calculated by the base station X at Step S10 and the traffic volumes of the other adjacent base stations reported via the transmission line interface 54 (Step S16). Furthermore, by comparing the index value calculated at Step S16 with a predetermined threshold, the control unit 58 in the base station X selects its own state (one of the first, the second, and the third states) and determines whether the current state is to be shifted (Step S18). If the control unit 58 determines that the state is to be shifted from the current state to another state (YES at Step S18), the control unit 58 outputs a state shift report containing a new state of the base station X to an adjacent base station via the transmission line interface 54 (Step S20), and performs a process related to the state shift (Step S22). For example, if the state is shifted from the first state (normal operation state) to the second state (electrical power saving state), in the base station X, an operation stop process is performed by blocking a power supply or the transmission parameter is adjusted by the control unit 58 and the transmission parameter adjusting unit 59 adjust such that an area of a cell becomes smaller than that in the first state. If it is determined that, at Step S18, the state is not to be shifted from the current state to another state, no process is performed.

It is assumed that, from among the plurality of adjacent base stations adjacent to the base station X, the adjacent base station adj_1 is previously defined as a base station that covers a reduction in the area of the cell of the base station X that is in the second state (electrical power saving state). If the state shift report received at Step S20 indicates a shift of the base station X from the first state to the second state, the adjacent base station adj_1 performs a process at Step S24. Specifically, at Step S24, the control unit 58 and the transmission parameter adjusting unit 59 in the adjacent base station adj_1 adjust the transmission parameter such that the area of the cell becomes wider than that in the first state in order to cover the reduction in the area of the cell of the base station X. Accordingly, the configuration state is changed from the first cell configuration to the second cell configuration.

As described above, in the mobile communication system according to the first embodiment, in each of the base stations in a service area, an index value for selecting a state of the corresponding base station is calculated by taking into consideration not only the traffic volume of the corresponding base station but also the traffic volumes of all of the adjacent base stations adjacent to the corresponding base station. Each of the index values is calculated as a predicted value by predicting the maximum increase in a traffic volume of a mobile station that is possibly handed over from an adjacent base station. Accordingly, the base station is not shifted its state after the mobile station is handed over; therefore, communication and the transmission speed of a mobile station is maintained before and after the handover of the mobile station.

[b] Second Embodiment

In the following, a second embodiment will be described.

In a mobile communication system according to the second embodiment, a method of calculating an index value for selecting the respective state of each of the base stations differs from the method using Equation (1) above. For the second embodiment, the configuration of the base station is the same as that in the first embodiment (see FIG. 5).

Figure 7:
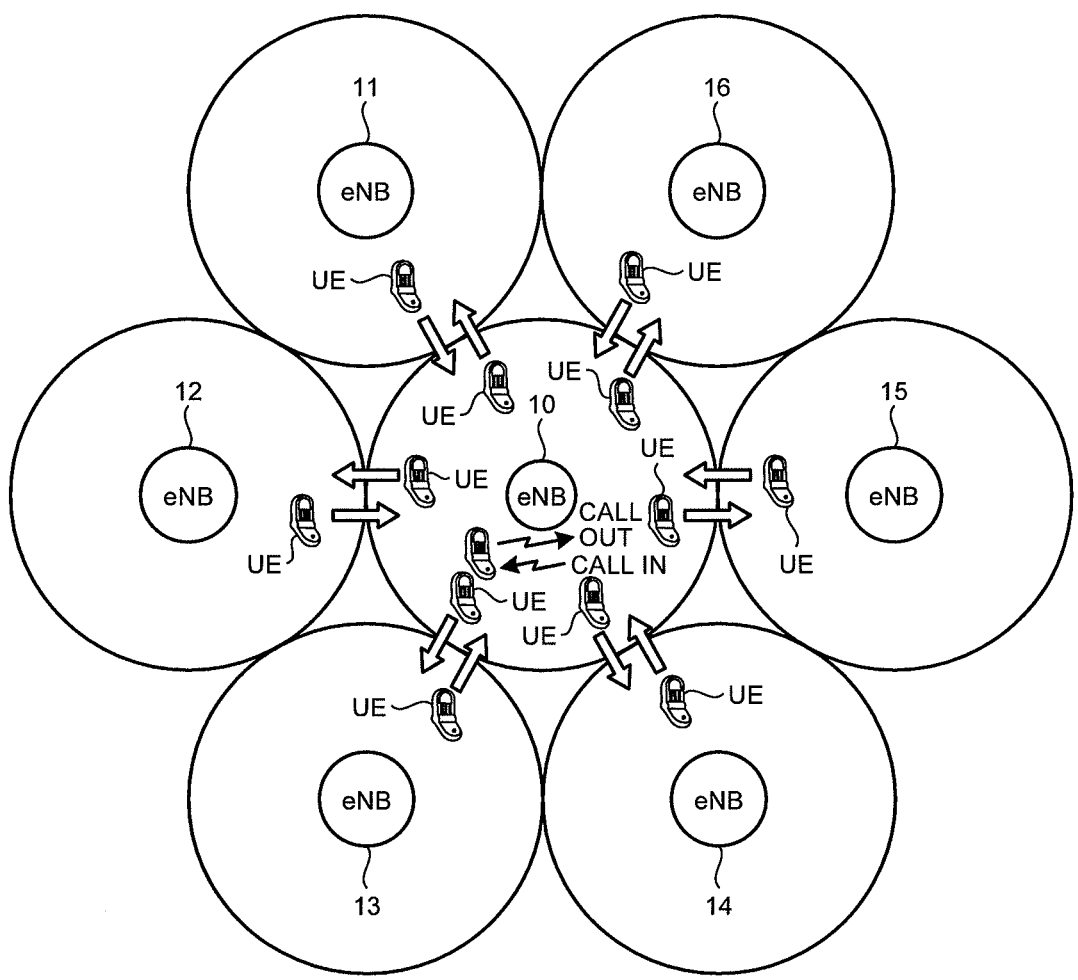
FIG. 7 is a schematic diagram illustrating an example configuration of a mobile communication system according to a second embodiment.

In the second embodiment, in each of the base stations in a service area, when an index value is calculated, an inflow and an outflow of the traffic volume due to a handover between adjacent base stations and, moreover, the occurrence and the disappearance of calls in a base station are taken into consideration. A description will be given with reference to FIG. 7, which illustrates the same system illustrated in FIG. 3. As conceptually illustrated in FIG. 7, when the base station eNB 10 calculates an index value, the inflow and outflow of the traffic volume due to a handover among the adjacent base stations eNBs 11 to 16 and, moreover, the occurrence and the disappearance of calls in the base station eNB 10 are taken into consideration. The base station eNB 10 accurately calculates, on the basis of a statistical value, a predicted value of the future traffic volume, in which a handover between the adjacent base stations and incoming calls and outgoing calls in the base station eNB 10 are taken into consideration.

In the following, a method for calculating an index value of an arbitrary base station X in a service area according to the second embodiment will be described in more detail.

The focus here is on a base station X in a service area and a plurality of base stations adj_1, adj_2, . . . , and adj_N, which are adjacent to the base station X. In the second embodiment, an index value of the base station X is calculated using Equation (2) below:

$$\text{Index value} = \text{Traffic}\_X + \Sigma(\text{Traffic}\_\text{adj}\_n * H\_\text{in}\_n) - \Sigma(\text{Traffic}\_X * H\_\text{out}\_n) + MOCq\_X * MOC\_X - MTq\_X * MT\_X \quad (2)$$

In Equation (2) above, Traffic_X is the current traffic volume occurring in the cell of the base station X, i.e., the traffic volume (the first traffic volume) currently occurring in the base station X; Traffic_adj_n (n=1, 2, . . . , N) is the current traffic volume occurring in the respective cells of the plurality of base stations adj_1, adj_2, . . . , and adj_N, which are adjacent to the base station X, i.e., the traffic volume (the second traffic volume) currently occurring in each of the base stations; and Σ is the sum of n=1, 2, . . . , and N.

In Equation (2) above, H_in_n (n=1, 2, . . . , and N) is the percentage of the traffic volume flowing into the base station X from each of the plurality of base stations adj_1, adj_2, and adj_N, which are adjacent to the base station X, due to the handover of each mobile station, i.e., the statistical value of the inflow rate due to the handover. Accordingly, the second term (Σ (Traffic_adj_n*H_in_n)) in Equation (2) indicates the sum of the predicted value of the traffic volume flowing into the base station X from the adjacent base station. For example, the inflow rate is preferably calculated by averaging samples obtained over a long time period and is then sequentially updated by using a moving average value.

In Equation (2) above, H_out_n (n=1, 2, . . . , and N) is the percentage of the traffic volume flowing out from the base station X to each of the plurality of base stations adj_1, adj_2, . . . , and adj_N, which are adjacent to the base station X, due to the handover of each mobile station, i.e., the statistical value of the outflow rate due to the handover. Accordingly, the third term (Σ (Traffic_X*H_out_n)) in Equation (2) indicates the sum of the predicted value of the traffic volume flowing out from the base station X to each of the adjacent base stations. For example, the outflow rate is preferably calculated by averaging samples obtained over a long time period and is then sequentially updated using a moving average value.

In Equation (2) above, MOCq_X is the average value (statistical value) of the traffic volumes occurring due to outgoing calls and incoming calls that have occurred in the base station X; MOC_X is the rate (statistical value) of outgoing calls and incoming calls that have occurred in the base station X. MOCq_X is, for example, the average value (statistical value) of the traffic volumes occurring in a day due to outgoing calls and incoming calls that have occurred in the base station X. MOC_X is, for example, the ratio, per hour, of the mobile stations which cause an outgoing call or an incoming call among all the mobile stations in the base station X. Thus, the fourth term (MOCq_X*MOC_X) in Equation (2) indicates the predicted value of the traffic volume occurring due to outgoing calls and incoming calls that have occurred in the base station X at a desired time of a day. Because MOCq_X and MOC_X are assumed to be significantly different statistical values depending on the day of the week or depending on the time, it is preferable to sequentially obtain samples depending on the day of the week and time and it is preferable to update MOCq_X and MOC_X in the base station X. MOCq_X and MOC_X are updated by, for example, using moving average values of the samples for each day and time.

In Equation (2) above, MTq_X is the average value (statistical value) of the traffic volumes disappearing due to calls terminated in the base station X; and MT_X is the rate (statistical value) of calls terminated in the base station X. MTq_X is, for example, the average value (statistical value) of the traffic volumes in a day disappearing due to calls terminated in base station X. MT_X is, for example, the ratio, per hour, of the mobile stations that terminate calls among all the mobile stations in the base station X. Thus, the fifth term (MTq_X*MT_X) in Equation (2) indicates the predicted value of the traffic volume disappearing due to calls terminated in the base station X at a desired time of the day. Because MTq_X or MT_X are assumed to be significantly different statistical values depending on the day of the week or depending on the time, it is preferable to sequentially obtain samples depending on the day of the week and time and it is preferable to update MTq_X and MT_X in the base station X. MTq_X and MT_X are updated by, for example, using moving average values of the samples for each day and time.

Each of the statistical values used for the calculation in Equation (2) is stored in the storing unit 20 (see FIG. 5) in the base station X.

The following is a comparison between the method for calculating an index value in the first embodiment and that in the second embodiment.

The index value calculated in the first embodiment is a predicted value of the future traffic volume of the base station X calculated from the sum of the current traffic volumes of the base station X and the adjacent base stations; therefore, the index value may possibly be an overestimation of the future traffic volume of the base station X. This is preferable from the perspective of reliably avoiding degradation of the communication of a mobile station to be handed over; however, the first cell configuration (normal cell configuration) tends to be used more than needed and thus the electrical power saving capacity may possibly be sacrificed to some extent. In contrast, with the method for calculating an index value according to the second embodiment, as described above, the inflow and the outflow of the traffic volume due to the handover of the base station X and, moreover, the occurrence and the disappearance of calls in the subject base station are taken into consideration; therefore, when compared with the method according to the first embodiment, it is possible to accurately predict a future traffic volume. For example, by using Equation (2), the future traffic volume of the base station X after a predetermined time has elapsed since the current time can be accurately predicted and thus the state of a base station X can be selected on the basis of this predicted value. Consequently, with the method for calculating an index value according to the second embodiment, the first cell configuration (normal cell configuration) and the second cell configuration (electrical power saving cell configuration) can more appropriately be selected when compared with the method according to the first embodiment. Specifically, in the second embodiment, both the communication between mobile stations and the capacity of electrical power saving can be maintained at a high level.

As described above, in the second embodiment, on the basis of Equation (2) above, each of the base stations in a service area preferably predicts the traffic volume of its base station after a predetermined time has elapsed since the current time. The predetermined time can be arbitrarily set. For example, a predetermined time may also be set such that a transition time between the first cell configuration (normal cell configuration) and the second cell configuration (electrical power saving cell configuration) can be accommodated.

Furthermore, in the second embodiment, a description has been given of a case in which the statistical values used in Equation (2) are sequentially updated in each of the base stations. However, in the second cell configuration (electrical power saving cell configuration), a base station that enters the second state (electrical power saving state) does not obtain, as a sample and by the base station, a statistical value in a cell area (hereinafter, referred to as an "area A1") that is to be covered by the base station when it is in the first state (normal operation state). Accordingly, in the second cell configuration, for a base station (hereinafter, referred to as a "base station Y2") that enters the second state, a base station (hereinafter, referred to as a "base station Y1") that enters the third state acquires, as a sample, a statistical value in a cell area that is to be covered by the base station Y2 when it is in the first state. Then, when an appropriate time after the power supply of the base station Y2 is restored, e.g., when the base station Y2 shifts from the second cell configuration to the first cell configuration, the base station Y1 preferably submits the sample acquired under the second cell configuration to the base station Y2. Accordingly, the base station Y2 can continue appropriately and continuously updating statistical values regardless of its cell configuration.

When the above process is performed, because the base station Y1 acquires, as a sample, a statistical value of a cell area (the area A1 mentioned above) to be covered when the base station Y2 is in the first state, geographical information on the area A1 is previously stored. Furthermore, the base station Y1 acquires position information (for example Global Positioning System (GPS) information) on each of the mobile stations that are connected in the second cell configuration. When the base station Y1 calculates the traffic volume related to the subject mobile station, the base station Y1 sequentially determines whether the subject mobile station is contained in the area. Accordingly, the base station Y1 can distinguish a sample in the area A1 from a sample in another area.

In Equation (2) above, the terms after the second term can be excluded. For example, an index value may be calculated only from the second and third terms and by taking into consideration a handover. Alternatively, to estimate a large value, an index value may also be calculated by taking into consideration only the second and the fourth terms that are added to the first term.

[c] Third Embodiment

In the following, a third embodiment will be described.

Mobile Communication System

A mobile communication system according to a third embodiment differs from the first and the second embodiments described above in that an EMS or an OPS is included as a control device that manages the index values of all the base stations in a service area. In the example described below, an EMS functioning as a control device selects the state of each of the base stations and determines the cell configuration on the basis of the index value of each of the base stations in a centralized manner.

Figure 8:
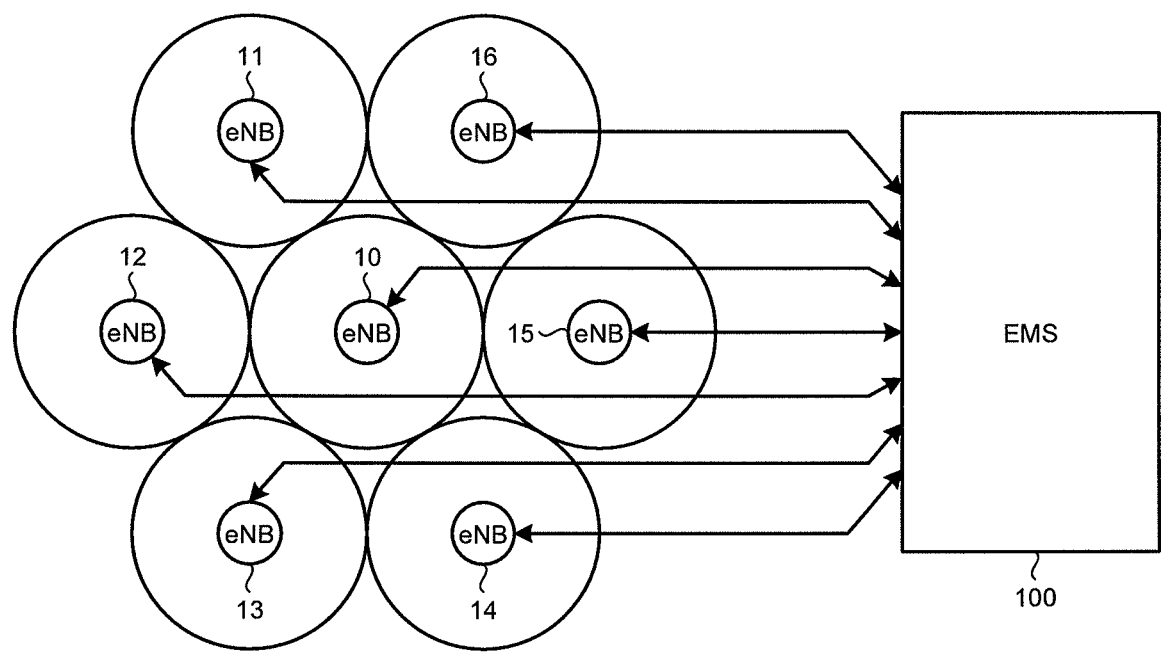
FIG. 8 is a schematic diagram illustrating an example configuration of a mobile communication system according to a third embodiment.

FIG. 8 is a schematic diagram illustrating an example configuration of a mobile communication system according to a third embodiment. Each of the base stations eNBs 10 to 16 in the service area is connected to an external EMS 100 using a communication link, which may be wired or wireless, and the control according to the third embodiment is performed by using this communication link. The calculation method for calculating an index value by the EMS 100 can be the methods described in the first and the second embodiments. The configuration of each base station according to the third embodiment is substantially the same as that illustrated in FIG. 5; however, in the base station according to the third embodiment, the control unit 58 does not need to calculate an index value nor to perform a process for selecting a state.

Figure 9:
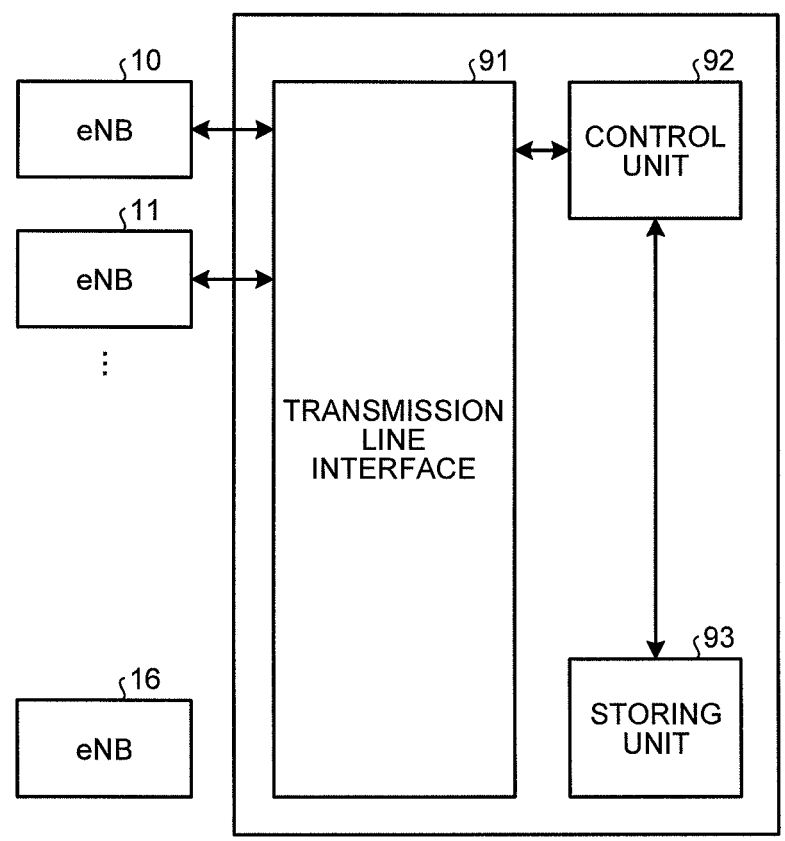
FIG. 9 is a block diagram illustrating, in outline, the configuration of an EMS according to the third embodiment.

FIG. 9 is a block diagram illustrating, in outline, the configuration of an EMS according to the third embodiment.

As illustrated in FIG. 9, the EMS according to the third embodiment includes the base stations eNBs 10 to 16 in a service area, a transmission line interface 91 used to perform communication by using the communication link, a control unit 92, and a storing unit 93.

The control unit 92 is mainly formed by a microcontroller and performs various kinds of control inside the base station and signal processing as needed. The storing unit 93 stores therein data used for the control performed by the control unit 92. The control unit 92 accesses the storing unit 93 for reading and writing data.

The control unit 92 acquires the traffic volume of each of the base stations via the transmission line interface 91.

For example, the control unit 92 calculates, for each base station, an index value using Equation (1) on the basis of the traffic volume of the base station and the traffic volume of the adjacent base stations adjacent to the base station. Furthermore, by comparing the calculated index value with a predetermined threshold, the control unit 92 determines the state (one of the first, the second, and the third states) of each of the base stations. In other words, a cell configuration is determined. The control unit 92 notifies, via the transmission line interface 91, each of the base stations of the determined state of each of the base stations.

When the control unit 92 calculates the index value using Equation (2), samples used to calculate various statistical values are provided from each of the base stations via the transmission line interface 91. The various statistical values are retained in the storing unit 93 in a centralized manner and are sequentially updated by the control unit 92.

Method for Controlling the Transmission Parameter

Figure 10:
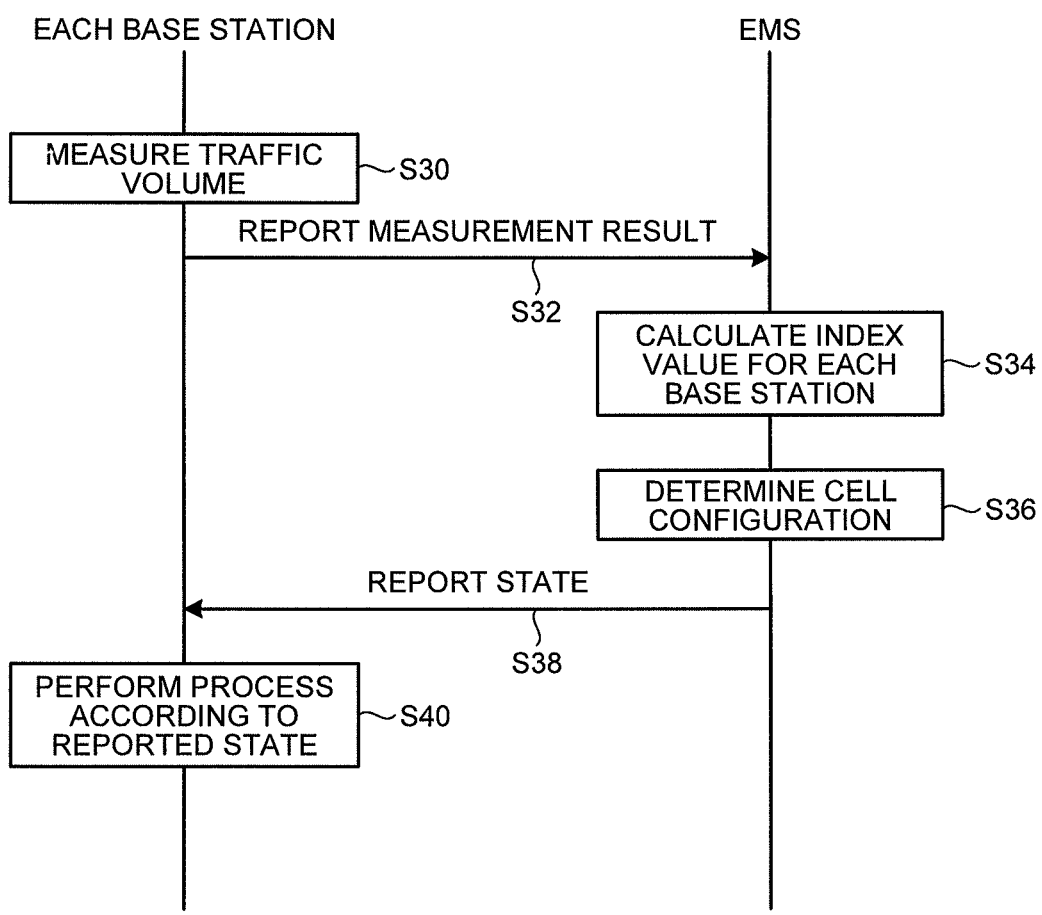
FIG. 10 is a flowchart illustrating the flow of a process performed between each base station and the EMS according to the third embodiment.

In the following, an example of a method for controlling the transmission parameter performed between each of the base stations in a service area and the EMS will be described with reference to FIG. 10. FIG. 10 is a flowchart illustrating the flow of a process performed between each base station and the EMS according to the third embodiment. The flowchart illustrated in FIG. 10 illustrates a case in which an index value is calculated using Equation (1) above; however, this can also be, of course, used as a method (for example, a calculation method using Equation (2)) for calculating another index value.

In FIG. 10, first, the control unit 58 measures a traffic volume in each of the base stations (Step S30) and the measurement result thereof is reported to the EMS by the transmission line interface (Step S32).

In the EMS, the control unit 92 calculates, for each base station, an index value given by Equation (1) on the basis of the traffic volume of each of the base stations reported at Step S32 (Step S34). In the EMS, by comparing the index value calculated at Step S34 with a predetermined threshold, the control unit 92 determines, for each base station, the state (one of the first, the second, and the third states) of each of the base stations. In other words, the cell configuration is determined (Step S36). The determined state of each of the base stations is reported to each of the base stations (Step S38). Each of the base stations performs a process such that its state is reported to each of the base stations at Step S38 (Step S40). The process includes an operation stop process due to the power supply being blocked or an adjusting process performed on the transmission parameter.

As described above, in the mobile communication system according to the third embodiment, the cell configuration in a service area is changed by the EMS in a centralized manner. Consequently, it is obvious that the same operation and advantages as those of the first and the second embodiments be provided.

The embodiments according to the present invention has been described; however, the communication device, the control device, and the method for adjusting the transmission parameter according to the present invention are not limited to the embodiments described above. Various modifications and changes are of course possible as long as they do not depart from the spirit of the present invention.

Modification

When the cell configuration is changed, it is preferable to smoothly change the transmission parameter by using a method in which the processing load of the base station does not rapidly increase. From this perspective, a preferred method for changing the transmission parameters before and after the cell configuration is changed will be described with reference to FIG. 11.

FIG. 11 illustrates the radio transmission electrical power of the base station eNB 10 and the base station eNB 15. The horizontal axis indicates the time and the vertical axis indicates the transmission parameter. In FIG. 11, at time $t_0$, the first cell configuration (normal cell configuration) is set and both the base stations eNBs 10 and 15 are in the first state (normal operation state). At time $t_3$ to $t_4$, the second cell configuration (electrical power saving cell configuration) is set; the base station eNB 10 is in the second state (electrical power saving state); and the base station eNB 15 is in the third state (in the state in which the transmission electrical power is raised). At time $t_7$, the first cell configuration (normal cell configuration) is again set and both the base stations eNBs 10 and 15 are in the first state (normal operation state). Specifically, at time $t_0$ to $t_7$, in accordance with a decrease and an increase in traffic, the cell configuration shifts as follows: the first cell configuration→the second cell configuration→the first cell configuration. In the example illustrated in FIG. 11, the transmission electrical power in the first state is set to 50%, the transmission electrical power in the second state is set to 0%, and the transmission electrical power in the third state is set to 100%.

During the transitional period of the state change, i.e., both at time $t_0$ to $t_3$ and at time $t_4$ to $t_7$ illustrated in FIG. 11, the transmission electrical power is gradually changed for each area that is divided in accordance with communication bands and is performed cooperatively between the base station eNB 10 and the base station eNB 15 (in FIG. 11, a band F1, F2, and F3, for example). During the transitional period, the transmission electrical power may also be changed at a similar change rate in all the bands. Alternatively, as illustrated in FIG. 11, the transmission electrical power may also be changed using a time lag for each band. In the example illustrated in FIG. 11, at time $t_1$, the base station eNB 15 changes the transmission electrical power of the band F1 form 50% to 100% and the base station eNB 10 changes the transmission electrical power of the band F1 from 50% to 0%. Furthermore, in the example illustrated in FIG. 11, at time $t_0$ to $t_3$, the base station eNB 15 gradually changes the transmission electrical power of the bands F2 and F3 from 50% to 100% and the base station eNB 10 gradually changes the transmission electrical power of the bands F2 and F3 from 50% to 0%. Because the number of mobile stations that can be accommodated in a base station is determined for each band, by changing the transmission electrical power for each band with the base station eNB 10 and the base station eNB 15 cooperating with each other, it is possible to smoothly perform the handover of a mobile station during the transitional period between the base station eNB 10 and the base station eNB 15. Accordingly, the processing load on each of the base stations does not rapidly increase before and after the cell configuration is changed.

In the above description, a description has been given of a case in which a cell is formed by a base station and a transmission parameter of the base station used to control a cell area is to be adjusted. However, if a transmission parameter of a base station to be adjusted is formed by multiple sectors that form a single cell, it can be assumed that a base station is constituted by a communication device arranged for each sector. In such a case, a transmission parameter is adjusted for each of the communication devices that constitute the base station. Specifically, the state (one of the first, the second, or the third states) is selected for each of the communication devices that constitute a base station.

According to an aspect of an embodiment of the communication device, the control device, and the method of adjusting a transmission parameter, in a mobile communication system including a plurality of communication devices that form a cell, when the operation state or the transmission parameter of each of the communication devices is adjusted, the communication of a mobile station can be maintained between cells of communication devices.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device that performs radio communication with a mobile station by forming a first cell and that is connected with other communication devices via a communication link, the communication device comprising:
    a first information acquiring unit that acquires a first traffic volume corresponding to a traffic volume that occurs in the first cell at a first time;
    a second information acquiring unit that acquires a second traffic volume corresponding to a traffic volume that occurs at the first time in each of second cells of second communication devices adjacent to the communication device by using communication with the second communication devices;
    a calculating unit that calculates a predicted value, in a future relative to the first time, of a traffic volume occurring in the first cell on the basis of the first traffic volume and the second traffic volume, the predicted value reflecting a maximum increase in a traffic volume caused by a handover of a mobile station; and
    an adjusting unit that adjusts a transmission parameter of the communication device on the basis of the predicted value.

2. The communication device according to claim 1, further comprising:
    a first storing unit that stores therein, as a first statistical value, an incidence of a handover of a mobile station between the first cell and each of the second cells for each date and time,
    wherein the calculating unit further calculates, by referring to the first statistical value, the predicted value on the basis of the incidence of the handover after a predetermined time has elapsed since the first time.

3. The communication device according to claim 1, further comprising:
    a second storing unit that stores therein, as a second statistical value, a traffic volume occurring in the first cell and a traffic volume terminated in the first cell for each date and time,
    wherein the calculating unit further calculates, by referring to the second statistical value, the predicted value on the basis of a third traffic volume occurring in the first cell after a predetermined time has elapsed since the first time and on the basis of a fourth traffic volume terminated in the first cell after a predetermined time has elapsed since the first time.

4. The communication device according to claim 2, further comprising:
    a second storing unit that stores therein, as a second statistical value, a traffic volume occurring in the first cell and a traffic volume terminated in the first cell for each date and time,
    wherein the calculating unit further calculates, by referring to the second statistical value, the predicted value on the basis of a third traffic volume occurring in the first cell after a predetermined time has elapsed since the first time and on the basis of a fourth traffic volume terminated in the first cell after a predetermined time has elapsed since the first time.

5. The communication device according to claim 4, wherein a sample is acquired for each date and time and at least one of the first statistical value and the second statistical value is sequentially updated.

6. A control device that is connected to a plurality of communication devices, each of which performs radio communication with a mobile station by forming a cell via a communication link, and that controls each of the communication devices, the control device comprising:
    a first information acquiring unit that acquires a first traffic volume corresponding to a traffic volume that occurs in a first cell of a first communication device at a first time;
    a second information acquiring unit that acquires a second traffic volume corresponding to a traffic volume that occurs in each of second cells of second communication devices adjacent to the first communication device at the first time;
    a calculating unit that calculates a predicted value, in a future relative to the first time, of a traffic volume occurring in the first cell on the basis of the first traffic volume and the second traffic volume, the predicted value reflecting a maximum increase in a traffic volume caused by a handover of a mobile station; and
    a control unit that controls, on the basis of the predicted value, a transmission parameter with which the first communication device is instructed.

7. The control device according to claim 6, further comprising:
    a first storing unit that stores therein, as a first statistical value, an incidence of a handover of a mobile station between the first cell and each of the second cells for each date and time,
    wherein the calculating unit further calculates, by referring to the first statistical value, the predicted value on the basis of the incidence of the handover after a predetermined time has elapsed since the first time.

8. The control device according to claim 6, further comprising:
    a second storing unit that stores therein, as a second statistical value, a traffic volume occurring in the first cell and a traffic volume terminated in the first cell for each date and time,
    wherein the calculating unit further calculates, by referring to the second statistical value, the predicted value on the basis of a third traffic volume occurring in the first cell after a predetermined time has elapsed since the first time and a fourth traffic volume terminated in the first cell after a predetermined time has elapsed since the first time.

9. The control device according to claim 7, further comprising:
a second storing unit that stores therein, as a second statistical value, a traffic volume occurring in the first cell and a traffic volume terminated in the first cell for each date and time,
wherein the calculating unit further calculates, by referring to the second statistical value, the predicted value on the basis of a third traffic volume occurring in the first cell after a predetermined time has elapsed since the first time and a fourth traffic volume terminated in the first cell after a predetermined time has elapsed since the first time.

10. The control device according to claim 9, wherein a sample is acquired for each date and time and at least one of the first statistical value and the second statistical value is sequentially updated.

11. A method for adjusting, in a mobile communication system that includes a plurality of communication devices, a transmission parameter of each of the communication devices, the method comprising:
acquiring a first traffic volume corresponding to a traffic volume that occurs in a first cell of a first communication device at a first time;
acquiring a second traffic volume corresponding to a traffic volume that occurs in each of second cells of second communication devices adjacent to the first communication device at the first time;
calculating, on the basis of the first traffic volume and the second traffic volume, a predicted value of the traffic volume in a future relative to the first time in the first cell, the predicted value reflecting a maximum increase in a traffic volume caused by a handover of a mobile station; and
adjusting, on the basis of the predicted value, a transmission parameter of the first communication device.

12. The method according to claim 11, further comprising:
firstly storing, as a first statistical value, an incidence of a handover of a mobile station between the first cell and each of the second cells for each date and time,
wherein the calculating further calculates, by referring to the first statistical value, the predicted value on the basis of the incidence of the handover after a predetermined time has elapsed since the first time.

13. The method according to claim 11, further comprising:
secondly storing, as a second statistical value, a traffic volume occurring in the first cell and a traffic volume terminated in the first cell for each date and time,
wherein the calculating further calculates, by referring to the second statistical value, the predicted value on the basis of a third traffic volume occurring in the first cell after a predetermined time has elapsed since the first time and on the basis of a fourth traffic volume terminated in the first cell after a predetermined time has elapsed since the first time.

14. The method according to claim 12, further comprising:
secondly storing, as a second statistical value, a traffic volume occurring in the first cell and a traffic volume terminated in the first cell for each date and time,
wherein the calculating further calculates, by referring to the second statistical value, the predicted value on the basis of a third traffic volume occurring in the first cell after a predetermined time has elapsed since the first time and on the basis of a fourth traffic volume terminated in the first cell after a predetermined time has elapsed since the first time.

15. The method according to claim 14, further comprising:
acquiring a sample for each date and time; and
updating sequentially at least one of the first statistical value and the second statistical value.

16. The method according to claim 11, wherein, when an area of the first cell is reduced at the adjusting and when a transmission parameter of the second communication device is adjusted to cause the second communication device to cover a reduction in the area of the first cell,
the adjusting adjusts the transmission parameter such that a change rate of the transmission parameter coincides between the first communication device and the second communication device.

* * * * *